July 1, 1958

R. R. ROUP ET AL 2,841,508

ELECTRICAL CIRCUIT ELEMENTS

Filed May 27, 1955

INVENTORS:
Rolland R. Roup
Jack S. Kilby
by John W. Michael
Attorney

July 1, 1958    R. R. ROUP ET AL    2,841,508
ELECTRICAL CIRCUIT ELEMENTS
Filed May 27, 1955    3 Sheets-Sheet 2

INVENTORS:
Rolland R. Roup
Jack S. Kilby
by John W. Michael
Attorney

July 1, 1958   R. R. ROUP ET AL   2,841,508
ELECTRICAL CIRCUIT ELEMENTS
Filed May 27, 1955   3 Sheets-Sheet 3
Fig. 11
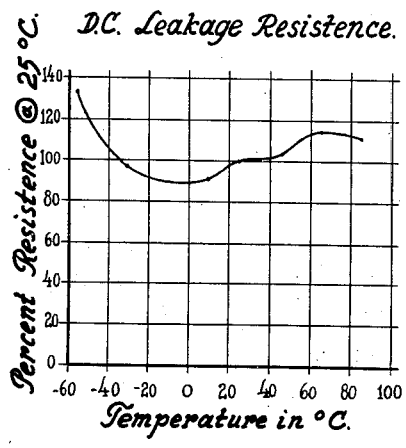
Fig. 13
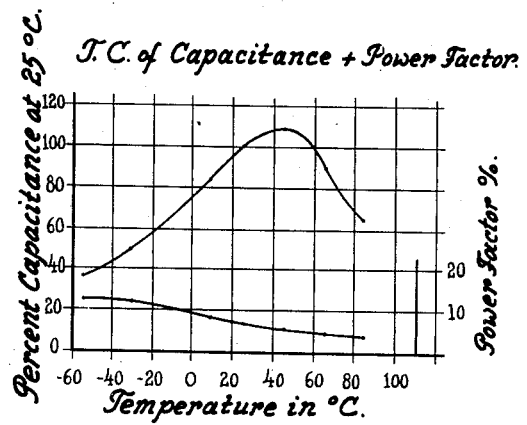
Fig. 14
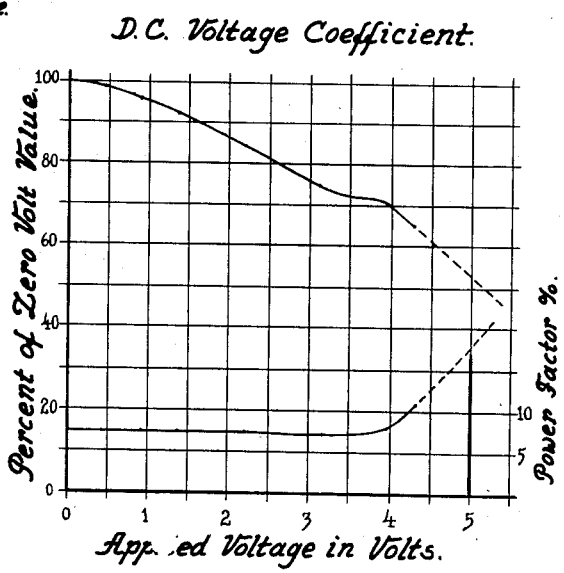
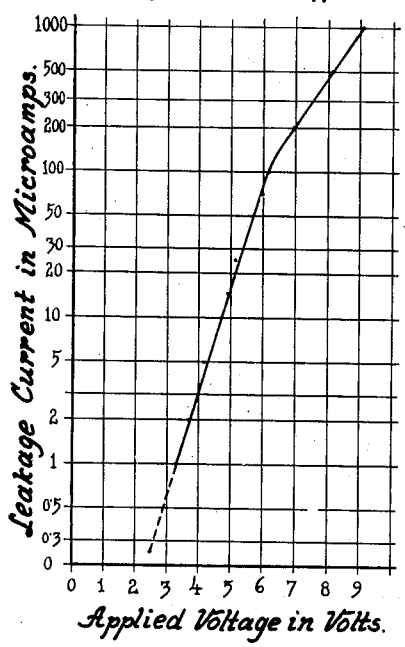
Fig. 12
INVENTORS:
Rolland R. Roup
Jack S. Kilby
by John W. Michael
Attorney

United States Patent Office 2,841,508
Patented July 1, 1958

2,841,508

ELECTRICAL CIRCUIT ELEMENTS

Rolland R. Roup and Jack S. Kilby, Milwaukee, Wis., assignors to Globe-Union Inc., Milwaukee, Wis., a corporation of Delaware Application May 27, 1955, Serial No. 511,701

12 Claims. (Cl. 117—200)

This invention relates to electrical circuit elements of the type employing a uniform body of high dielectric constant material having properties of a semiconductor on which conducting electrodes are mounted and to the method of producing them. Elements of this type may function as rectifiers, thermistors, varistors, capacitors or combinations thereof.

It has been discovered that the nature of the contact between the conducting electrode and the semiconductor to a large extent controls the essential property which fits such element for the function selected.

It is the object of this invention to provide an electrical circuit element in which there is a contact between a semiconductor and a conducting electrode which establishes the electrical characteristics of the unit.

Another object of this invention is to provide such an element which is compact and functions as a high value capacitor which has low enough leakage and good enough power factor to have a wide range of usefulness.

In obtaining these objects the element has a conducting electrode on a uniform semiconductor. The contact or barrier layer between the conducting electrode and the semiconductor, for applications herein described, is preferably non-ohmic, that is rectifying. This barrier layer has the same chemical properties as the semiconductor. It is believed formed by positive charges in the semiconductor and negative charges on the inner surface of the conducting electrode which are bound in place and thereby cause the layer to act as an insulator. The thickness of such barrier layer is determined primarily by the dielectric constant of and the number of excess carrier ions in the semiconductor. Such thickness is extremely small and in the example hereinafter described is of the order of 0.0001 inch. The capacity at a single barrier layer increases with the square root of such dielectric constant and not directly proportional to it as in the conventional case. It is believed best, therefore, to maintain a high dielectric constant and a low number of excess free charges in order to prevent the barrier layer becoming so thin as to be masked by rough polycrystalline surfaces.

The uniform semiconductor consists of sintered metallic oxides of high dielectric constant. The materials and firing technique used herein create an n-type semiconductor in which the number of excess carriers (free electrons) are limited in number.

The conducting electrode may be applied to the semiconductor by metalizing processes including fired-on silver, fired-on platinum, evaporated zinc, graphite resistor paint, and other known methods.

The extreme thinness of the barrier layer (insulator) lying beneath the conducting electrode is a principal element in establishing capacitance and hence such capacitance can be readily increased by slight increase in surface area. A waffle pattern or other hill and valley surface will greatly increase capacitance without increasing the perimeter of the element. Furthermore, the conducting electrodes need not be placed on opposite sides of the semiconductor as the part between barrier layers acts as a conductor.

When the electric element is desired for use as a capacitor, the barrier layers under two conducting electrodes on the uniform semiconductor create two capacitances connected in series by the semiconductor and thus the total capacitance is less than if there were only one barrier layer. However, one of the barrier layers can be shorted out by increasing the leakage through such barrier layer. This may be done in several ways such as abrading the conducting electrode or by coating it with a low melting point solder. This affects the junction barrier layer or contact in some way not known and destroys its insulating effect. This approximately doubles the capacitance. Such unit must be connected in circuit with the solder side positive to obtain the lowest losses. This shorting of one barrier layer makes the element have the properties of a rectifier and this property may be increased by suitable adjustment of the mixes and firing technique.

In the accompanying drawings:

Fig. 11 is a graph showing the curve of the D. C. leakage resistance at varying temperatures of the electrical circuit element viewed in Figs. 1 and 2;

Fig. 12 is a vertical logarithmic axis graph showing the D. C. leakage current at various applied voltages of such element;

Fig. 13 is a graph showing the curve of temperature coefficient of capacitance and the curve of the power factor of such element; and Fig. 14 is a graph showing the curve of the D. C. voltage coefficient and the curve of the power factor of such element at various applied voltages.

To illustrate this invention and demonstrate its characteristics that form of electrical circuit element was selected which had the capacitance characteristics maximized to provide a compact high value capacitor with low leakage and good power factor. Such capacitors consist of a disc 10 about 0.25 of an inch in diameter and 0.024 of an inch thick which provides the mechanical support for silvered areas 12 and cooperates with such areas to provide the required electrical characteristics. Wire leads (not shown) are connected to the silvered areas by cement or solder. In the capacitors shown the disc 10 was made from a mix consisting substantially of the following:

| | Percent |
|---|---|
| Barium titanate | 84.5 |
| Strontium titanate | 15.0 |
| Mixture of rare earth oxides | 0.5 |

(as set forth in Roup et al. 2,520,376, issued August 1950).

This mixture was pelleted into a disc and fired to maturity in air at a temperature of about 2450° F. for approximately ½ hour. At this point the disc 10 is not a semiconductor but has the characteristics of an insulator or dielectric. The disc is then fired at a temperature of 2150° F. in hydrogen for about ½ to 1 hour. The firing in hydrogen reduces the disc 10 and causes it to exhibit semiconducting characteristics throughout. This reduction and firing technique determines the number of the excess carriers in the body so that it is an n-type conductor with a few such excess carriers. The disc thus becomes a uniform semiconductor having a dielectric constant believed to be in the neighborhood of 6000.

After the disc 10 has been reduced, the surfaces are painted with silver paint and the disc again fired either in air or nitrogen at about 1350° F. to form the electrodes 12 all in a manner well known to those skilled in the capacitor art.

Figure 9:
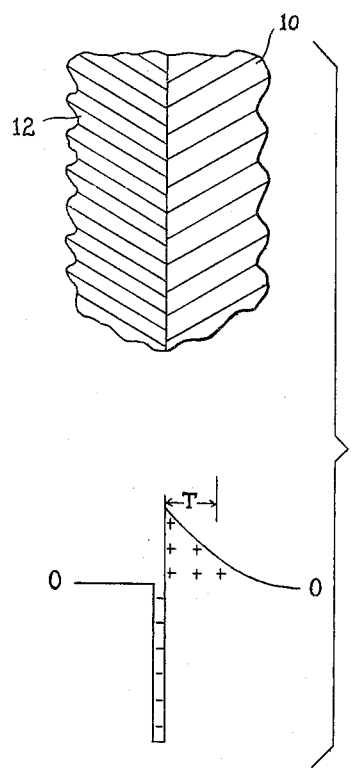
Fig. 9 is a bracketed figure consisting of (1) a greatly enlarged cross-sectional view of the line of juncture between the metal and semiconductor of an element forming a part of this invention and (2) a diagram positioned below and alined with such cross-sectional view illustrating the charge distribution and relative thickness of the barrier layer at such juncture.
Figure 10:
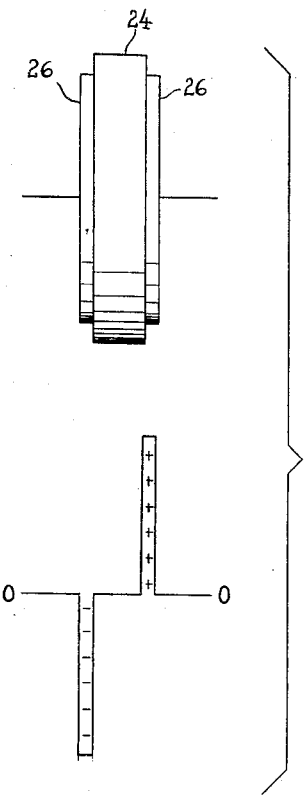
Fig. 10 is a bracketed figure consisting of (1) an enlarged view in side elevation of a conventional capacitor with two electrodes separated by an insulator and (2) a diagram positioned below and alined with such view illustrating the charge distribution and relative separation thereof in such capacitor.

In bracketed Fig. 9 there is diagrammatically shown the distribution of the plus and minus charges at one of the barrier layers between the semiconductor 10 and one of the metal electrodes 12. The negative charges are grouped on the surface of the metal 12. An equal number of positive charges are distributed over a narrow region near the surface of the semiconductor as is shown in the lower diagram, and bound to the negative charges to create an extremely thin layer which acts as an insulator. This barrier layer is of the order of 0.0001 inch thick, such thickness being graphically illustrated by the dimension T. The distribution of such charges in a conventional capacitor having a dielectric 24 and spaced metal electrodes 26 is diagrammatically shown in bracketed Fig. 10 to illustrate that in the conventional capacitor, the positive and negative charges are separated by the thickness of the dielectric 24 while in the barrier layer capacitance of this invention the charges are separated by a very thin layer. As there are two such barrier layers, the two capacities created by them are connected by the semiconducting material of the interior of the disc 10 and the total capacity will generally be about half of the capacity of a single barrier layer. Each of the barrier layers acts as rectifying contacts. Each can be treated as consisting of a capacitance in parallel with a resistance. This resistance represents the leakage current across the barrier layer. The effective thickness T of each barrier layer is a function of the dielectric constant and the number of excess carriers in the semiconductor 10. For this reason it is desirable to keep the dielectric constant high so that the barrier does not become so thin as to be masked by the rough polycrystalline surfaces of the semiconductor. Another characteristic of this element is that the capacity increases with the square root of the dielectric constant rather than being directly proportional to it. Because of these characteristics, this electric element does not conform to the generally known formula for determining capacitance.

Figure 1:
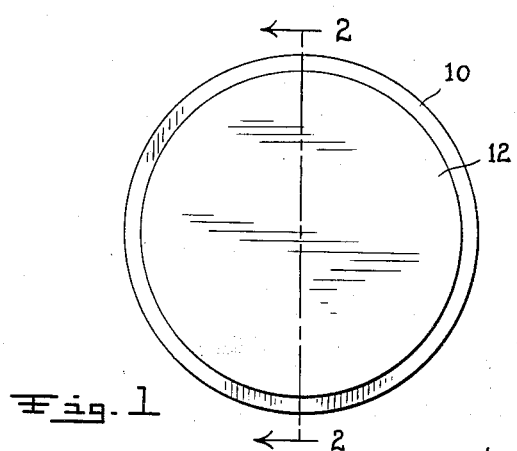
Fig. 1 is a view in side elevation of an electrical circuit element embodying the present invention.
Figure 2:
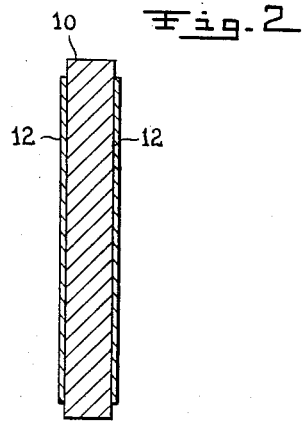
Fig. 2 is a sectional view taken on the line 2—2 of Fig. 1.

In order to find the various characteristics of an element like that shown in Figs. 1 and 2, leads were cemented to the electrodes 12. In determining the curve of the D. C. leakage resistance shown in Fig. 11, 4.4 volts D. C. were applied. In the curve of D. C. leakage current against applied voltage, shown in Fig. 12, the resistance was 10 megohms at 2.5 volts, 1 megohm at 4.25 volts and 0.1 megohm at 5.75 volts. In collecting the data for the graphs of Figs. 13 and 14, a standard bridge at 1 kilocycle was used. In the graphs of Figs. 13 and 14 the upper curve is the capacitance curve and the lower curve the power factor curve. These graphs show that the reduced titanate capacitor of Figs. 1 and 2 in applications up to 4 volts has good characteristics permitting a wide range of usage. It has produced capacitance of about 0.25 microfarad or up to 10 microfarads per square inch of the surface.

The semiconductor 10 containing barium titanate and strontium titanate belongs to the general group known as oxide semiconductors. The group includes MnO, $Fe_2O_3$, NiO, $Cu_2O$, $TiO_2$, plus more complicated oxides such as $ZnFe_2O_4$, $LaMnO_3$, and $SrTiO_3$. The materials which have been used consist of barium titanate alone or modified by additions of other materials including alkaline earth titanates, zirconates and stannates. It is thought that the addition of the rare earth oxide produces a semiconductor with controlled valence and n-type conduction (excess ions). If the small quantity of rare earth is not used and the reduction takes place at a higher temperature, say, about 2450° F., sufficient oxygen will be removed from the lattice to make a suitable semiconductor. Other additives can be used to produce conduction. In oxidizing (firing to maturity in air) a temperature range between 2250° to 2500° F. appears to be satisfactory. In reduction (firing in hydrogen) a temperature range of 2100° to 2200° F. appears to be satisfactory when the rare earth additive is used. It appears, therefore, that there is an infinite number of compositions which might make satisfactory semiconductors. A basic common requirement, however, is a high dielectric constant.

The metal electrodes 12 can be fired-on silver, fired-on platinum, and evaporated zinc. What little difference arises as a result of different methods of applying the metal to the semiconductor apparently results from the re-oxidation of the semiconductor which takes place during the firing-on of the metal. This difference can be compensated for to some extent by previous control in the previous reducing step of the semi-conductor. Hence, it appears that no particular type of metalizing is essential for good results.

Figure 3:
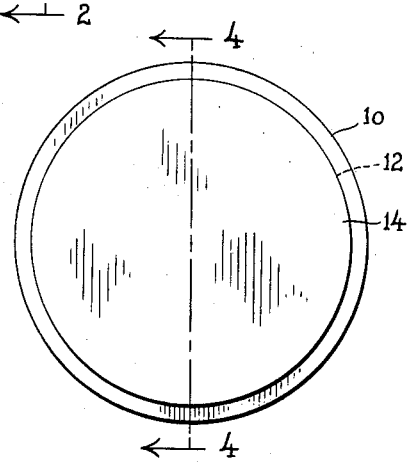
Fig. 3 is a view in side elevation of an electrical circuit element embodying a first modification of the present invention.
Figure 4:
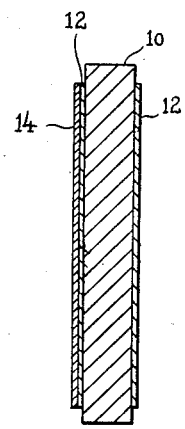
Fig. 4 is a sectional view taken on the line 4—4 of Fig. 3.

In the first modification of the element shown in Figs. 3 and 4, a layer 14 of low melting point solder (256° F.) is applied to one of the silver electrodes 12. This solder appears to destroy the junction between the electrode 12 and the semi-conductor 10 to the extent that the barrier layer beneath the electrode is shorted out. As the result one of the two capacitances is taken out of the series connection with the effect of doubling the capacity of the element. This shorting of one of the two opposed rectifying junctions also causes the unit to have the properties of a rectifier. Because of this the solder side 14 must be connected to the positive side of the circuit when the unit is used as a capacitor in order to have it operate with the lowest losses. This unit may thus perform both the function of a rectifier and the function of a capacitor.

Figure 5:
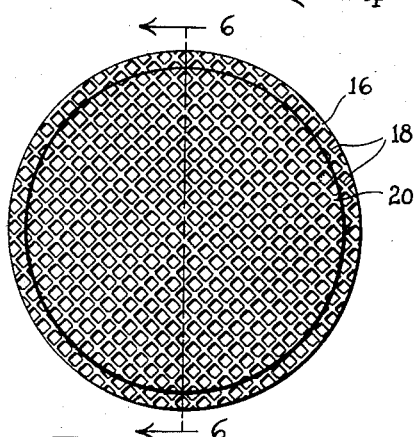
Fig. 5 is a view in side elevation of an electrical circuit element embodying a second modification of the present invention.
Figure 6:
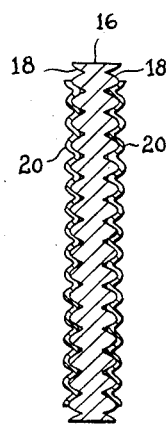
Fig. 6 is a sectional view taken on the line 6—6 of Fig. 5.

The electrical circuit element shown in Figs. 5 and 6 has a semiconductor 16 which in the pelleting thereof is provided with a series of depressions 18. In other respects the semiconductor 16 is the same as the semiconductor 10. The fired-on silver electrodes 20 are applied as heretofore described and a barrier layer is formed beneath such electrodes which has a greater surface area than that of the elements of Figs. 1 and 2 with the same outer dimensions. Such waffle pattern or any pattern having hills and valleys will be satisfactory. Because the barrier layer is quite thin the capacitance is determined by the surface area of the disc if the hills and valleys are at least several times the thickness of the barrier layer. It is not essential that waffle pattern be placed on both sides of the semiconductor 16. Elements with such pattern on one side only have produced capacitances of 0.4 microfarad as compared with 0.25 microfarad for the plane surface elements of same diameter.

Figure 7:
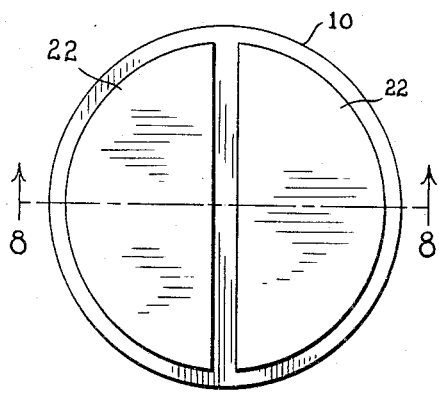
Fig. 7 is a view in side elevation of an electrical circuit element embodying a third modification of the present invention.
Figure 8:
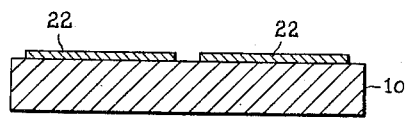
Fig. 8 is a sectional view taken on the line 8—8 of Fig. 7.

In Figs. 7 and 8 the semiconductor 10 has a pair of spaced metal electrodes 22 arranged in co-planar relationship on only one side thereof. The metal electrodes 22 are deposited in manner heretofore described. Since the primary contributing factor to the total capacitance of the element is the thin barrier layer underlying each metal electrode, it is not essential that the electrodes be placed on opposite sides of the semiconductor 10. Elements which have electrodes of the same area will have the same capacitance whether such electrodes are on opposite sides or on the same side of the semiconductor. However, when the electrodes are co-planar, there will be an increase in the resistance of the conductive part of the semiconductor which connects the two barrier layers due to increased length. Hence, the power factor of the co-planar electrode element will be higher.

With the exception of the element of Figs. 3 and 4, the elements which have been heretofore described are classified as symmetrical. They have two opposed rectifying junctions on the semiconductor and thus pass the current equally in both directions. If one of the contacts be rectifying (non-ohmic) and the other contact be non-rectifying (ohmic), such element (like that of Figs. 3 and 4), while useful as a capacitor, if polarized in the circuit, will be a true rectifier and such elements are classified as asymmetrical. As can be seen from Fig. 12, the leakage current is quite sensitive to the applied voltage. Hence, circuit elements with these characteristics may have application as varistors. By using a semiconductor which has a large temperature coefficient of dielectric constant the element will have characteristics which permit its use as a thermistor.

These electrical circuit elements may be made in disc shape, as shown, and in rectangular shape, both with or without multiple layers or with or without multiple discs. They may also be tubular in form with inner and outer electrodes.

What is claimed is:

1. An electrical circuit element having a body of high dielectric constant material having throughout properties of a semiconductor and a conducting electrode secured to a surface thereof.

2. A high value capacitor having a body consisting essentially of reduced titanate providing throughout a semiconductor and a pair of conducting electrodes fired on said body.

3. The method of making an electrical circuit element including forming a body of titanates of barium and strontium with a minor additive of rare earth oxide, firing said body to maturity in a reducing atmosphere to make said body throughout a uniform semiconductor having a high dielectric constant, and firing a metal electrode onto said body.

4. A high value capacitor having a body consisting essentially of a mixture of titanates of barium and strontium in reduced state providing throughout a semiconductor and having a high dielectric constant, a pair of metal electrodes bonded to said body, and a thin barrier layer having the same chemical properties as said semiconductor beneath said electrodes and having the electrical characteristics of an insulator.

5. A high value capacitor having a body of sintered metallic oxide with a high dielectric constant, said body throughout having the properties of a semiconductor, and a pair of metal electrodes bonded to said body, said capacitor having a power factor of less than 15% on applied voltages not in excess of 4.

6. An electrical circuit element having a body of sintered metallic oxides of high dielectric constant, said body throughout having the properties of a semiconductor, and a pair of metal electrodes bonded to the surface of said body with one rectifying junction shorted sufficiently to produce an asymmetrical characteristic.

7. An electrical circuit element having a body of sintered metallic oxides of high dielectric constant, said body throughout having the properties of a semiconductor, a pair of metal electrodes bonded to the surface of said body, and a layer of low melting point solder adhered to one of said electrodes to shunt out the barrier layer beneath said electrode.

8. The method of making an electrical circuit element including: forming a body comprising a mixture of the titanates of barium, strontium and calcium and the zirconates of barium and magnesium, and a trace amount of a mixture of rare earth oxides, in which the titanate of barium is predominant; firing said body to maturity in air within a temperature range of 2250° to 2500° F.; then firing said body in hydrogen within a temperature range of 2100° to 2300° F. for a period of ½ to 1 hour to reduce said body and cause it to have uniformly throughout the characteristic of a semiconductor; and applying to surfaces of said body spaced silver paint electrodes, and firing said electrodes at a temperature not in excess of 1600° F. whereby a thin barrier layer having the characteristic of an insulator is formed beneath said electrodes without change to the chemical composition of said reduced body.

9. A high value capacitor comprising a partially reduced, semiconducting throughout, high dielectric constant ceramic body consisting essentially of barium titanate, modified by additions of other materials from the group consisting of alkaline earth titanates, zirconates and stannates, and preferably a small addition of an oxide or oxides of the rare earth group, a pair of conducting electrodes bonded to said ceramic body, and a thin barrier layer having the same chemical properties as said semiconductor beneath said electrodes and having the electrical characteristics of an insulator.

10. An electrical circuit element having a body consisting essentially of sintered metallic oxides in reduced state having a high dielectric constant and providing throughout an n-type semiconductor in which the number of excess carriers are limited, a conducting electrode bonded to a surface of said body, and a non-ohmic barrier layer between said conducting electrode and said body having the same chemical properties as said semiconductor.

11. An electrical circuit element having a body consisting essentially of sintered metallic oxides in reduced state having a high dielectric constant and providing throughout an n-type semiconductor in which the number of excess carriers are limited, a conducting electrode bonded to a surface of said body, and a non-ohmic barrier layer between said conducting electrode and said body having the same chemical properties as said semiconductor, said layer being in the order of 0.0001 inch thick.

12. An electrical circuit element having a body consisting essentially of sintered metallic oxides in reduced state having a dielectric constant in the order of 6000 and providing throughout an n-type semiconductor in which the number of excess carriers are limited, a conducting electrode bonded to a surface of said body, and a non-ohmic barrier layer between said conducting electrode and said body having the same chemical properties as said semiconductor, the effective thickness of said barrier layer being a function of said dielectric constant and the number of excess carriers in said semiconductor.

References Cited in the file of this patent

UNITED STATES PATENTS

| | | |
|---|---|---|
| 1,864,828 | Joffe | June 28, 1932 |
| 2,303,391 | Rosenthal | Dec. 1, 1942 |
| 2,520,376 | Roup et al. | Aug. 29, 1950 |
| 2,633,543 | Howatt | Mar. 31, 1953 |

FOREIGN PATENTS

| | | |
|---|---|---|
| 645,890 | Germany | June 4, 1937 |